US006841977B2

(12) United States Patent
Huang et al.

(10) Patent No.: US 6,841,977 B2
(45) Date of Patent: Jan. 11, 2005

(54) SOFT-START WITH BACK BIAS CONDITIONS FOR PWM BUCK CONVERTER WITH SYNCHRONOUS RECTIFIER

(75) Inventors: Hong Huang, Austin, TX (US); Chris M. Young, Austin, TX (US)

(73) Assignee: Astec International Limited, Kwun Tong (HK)

( * ) Notice: Subject to any disclaimer, the term of this patent is extended or adjusted under 35 U.S.C. 154(b) by 0 days.

(21) Appl. No.: 10/378,696

(22) Filed: Mar. 3, 2003

(65) Prior Publication Data

US 2004/0174144 A1 Sep. 9, 2004

(51) Int. Cl.[7] .............................................. G05F 1/316
(52) U.S. Cl. ....................... 323/224; 323/272; 323/901
(58) Field of Search ................................ 323/224, 272, 323/901, 282

(56) References Cited

U.S. PATENT DOCUMENTS

| | | | |
|---|---|---|---|
| 4,922,404 A | 5/1990 | Ludwig et al. ................ 363/89 |
| 5,336,985 A | 8/1994 | McKenzie .................. 323/266 |
| 5,402,329 A | 3/1995 | Wittenbreder, Jr. .......... 363/16 |
| 5,552,695 A | 9/1996 | Schwartz .................... 323/271 |
| 5,636,116 A | 6/1997 | Milavec et al. ................ 363/89 |
| 5,920,475 A | * 7/1999 | Boylan et al. ............... 363/127 |
| 6,100,677 A | 8/2000 | Farrenkopf .................. 323/285 |
| 6,128,206 A | 10/2000 | Sun et al. .................... 363/127 |
| 6,191,964 B1 | 2/2001 | Boylan et al. ................ 363/89 |
| 6,204,648 B1 | 3/2001 | Saeki et al. ................. 323/282 |
| 6,307,356 B1 | * 10/2001 | Dwelley .................... 323/282 |
| 6,396,333 B2 | 5/2002 | Dubhashi et al. ........... 327/424 |
| 6,414,861 B1 | 7/2002 | Matsumoto et al. ....... 363/56.1 |
| 6,430,070 B1 | 8/2002 | Shi et al. ...................... 363/97 |
| 6,459,600 B2 | 10/2002 | Farrington et al. .......... 363/89 |

* cited by examiner

*Primary Examiner*—Shawn Riley
(74) *Attorney, Agent, or Firm*—Coudert Brothers LLP

(57) ABSTRACT

A circuit that efficiently prevents the turning on of the synchronous rectifier in a buck converter during a predetermined condition, so as to prevent current reversing through the synchronous rectifier during that time. In one embodiment, the circuit provides control of the synchronous rectifier during the soft-start time for a non-isolated DC-DC buck converter, thereby preventing current reversing (sinking), referred to as the back bias condition, during its soft start process. In another embodiment, a circuit uses a signal indicative of a soft-start condition for a converter to prevent the turning on of the synchronous rectifier during the soft-start time. A corresponding system solves the aforementioned synchronous rectifier back bias problem for converters used in a paralleled converter configuration.

14 Claims, 3 Drawing Sheets

SOFT-START WITH BACK BIAS CONDITIONS FOR PWM BUCK CONVERTER WITH SYNCHRONOUS RECTIFIER

FIELD OF INVENTION

The present invention relates to power converters, and more particularly, to a circuit that controls synchronous rectifier back bias in non-isolated DC-DC buck converters.

BACKGROUND OF THE INVENTION

Increasingly, synchronous rectifiers are replacing freewheeling diodes in non-isolated DC-DC buck converters in order to increase the power conversion efficiency of the converters. One feature of non-isolated DC-DC converters with synchronous rectification is that current is enabled to flow not only to the output terminals through the synchronous rectifier but also in a reverse direction from the output terminals back into the converter, i.e., a non-isolated dc-dc converter with synchronous rectification can have both current-sourcing and current-sinking capability.

A conventional buck converter is shown in FIG. 1. As is well known, a basic buck converter comprises a switch 6, an input filter capacitor 8, a freewheeling diode 12, an inductor 14, and a capacitor 16, connected in a conventional way between an input terminal 2 to which is coupled an input voltage $V_{in}$ relative to ground, and an output terminal 22 at which the buck converter generates a regulated output voltage $V_o$ relative to ground. An exemplary load 20 is shown coupled to the output of converter 10. The switch 6 is typically an electronic switch, such as a MOSFET, that is controlled in a known manner by a control circuit, e.g., a pulse width modulator (PWM) (not shown in FIG. 1) that is responsive to the output voltage $V_o$. When the switch 6 is closed, the capacitor 16 is charged via switch 6 and inductor 14 from the input voltage $V_{in}$ to produce the output voltage $V_o$, which is consequently less than the peak input voltage $V_{in}$. When switch 6 is open, current through the inductor 14, identified as $I_o$, is maintained via diode 12.

In order to boost power conversion efficiency, the freewheeling diode 12 is preferably replaced with a MOSFET, defined as a synchronous rectifier, identified as 18 in FIG. 1 and shown connected using dotted lines. In operation, synchronous rectifier 18 lowers the voltage drop across nodes 7 and 5 that otherwise exists with diode 12. Only unidirectional current flow is permitted through the freewheeling diode 12. By contrast, the synchronous rectifier 18 permits bi-directional current flow. As a result, inductor current, $I_o$, can flow in reverse through synchronous rectifier 18 from the output. Synchronous rectifier 18 is preferably controlled directly by a PWM (not shown). Although switch 6 and synchronous rectifier 18 are both driven by a PWM, it is well known that the control signals from the PWM for these elements are complementary signals such that switch 6 and synchronous rectifier 18 are never turned on at the same time, in order to prevent the shorting of the input terminal 2 to ground.

The bi-directional current flowing capability of the synchronous rectifier 18 may pose a serious problem when such rectifiers are used in paralleled power converters. The paralleling of power converters provides a way for two or more individual, small, high density power converter modules to supply the higher power required by current generation loads and/or to provide redundancy. Applications may also require various configurations of paralleled converters. A known application, e.g., for a digital signal processor, requires paralleled converters to be configured for sequential operation, wherein the converters are powered on sequentially according to a predetermined sequence. FIG. 2 is a block diagram of a prior art system having two paralleled power modules connected in a sequencing configuration to supply power to two loads. The parallel sequencing system 30 in FIG. 2 includes a converter 32 connected in parallel with a converter 34. According to the sequencing for an embodiment of system 30, converter 32 is always turned on before converter 34 is turned on. Each converter 32, 34 is a buck converter having a synchronous rectifier in place of the freewheeling diode, as shown in FIG. 1. As shown in FIG. 2, power is supplied to converters 32, 34 from a single power input, $V_{in}$, at input terminals 2, 4. It will be recognized by those skilled in the art that it is not necessary that power be supplied to the converter at a single power input port. Rather, each power module may receive power from a separate power source such as separate AC-DC converters (not shown). Converter 32 is coupled to output terminals 42 and 44 to supply an output voltage $V_{AO}$ to a load, shown schematically as 28. Converter 34 is coupled to output terminals 38, 40 to supply an output voltage $V_{BO}$ to a load, shown schematically as 26. The output of each converter 32, 34 is also coupled to the output terminals of the other converter via a diode 36. Diode 36 has an anode coupled to output terminal 42 of converter 32 and a cathode coupled to the output terminal 38 of converter 34. The corresponding negative output terminals 44, 40 of each converter are also connected as shown in FIG. 2.

In operation, converter 32 is turned on first while converter 34 remains off. During this time, the synchronous rectifier in converter 34 remains in an off state. At this time, converter 32 supplies an output voltage $V_{AO}$ to a load 28. However, since converter 34 is off, diode 36 is in a conduction state. As a result, converter 32 also provides power to a load 26. At this point in the sequence, converter 34 is turned on. As converter 34 begins to operate, its synchronous rectifier, now turned on, will pull down the paralleled outputs to a level corresponding to the programmed soft-start level for converter 34. This pulling-down effect causes a short circuit operation of converter 32 during the soft-start period for converter 34. This effect is one example of an effect commonly referred to as the "synchronous rectifier back bias" problem of non-isolated dc-dc buck converters. The synchronous rectifier of converter 34 will continue this "pulling-down" effect until the output voltage of converter 34 becomes equal to the output voltage of converter 32, at which point diode 36 no longer conducts and the two converter outputs become uncoupled from one another. In practice, a short circuit protection will be triggered and the system 30 cannot remain in operation without special attention. A need therefore exists for overcoming this synchronous rectifier back bias problem for the system of FIG. 2, while having the benefits provided by the use of a synchronous rectifier, namely reduced cost and higher density, as demanded for modern devices.

FIG. 3 is a block diagram of another configuration of a system of parallel converters (also referred to herein as "power modules"). For the paralleled converter configuration shown in FIG. 3, power is supplied to a common output voltage bus and thereby to a load. As shown in FIG. 3, power module 1, power module 2, ... power module N are each coupled to a single power output port 320 for supplying power to a load. An exemplary load 330 is shown coupled to output port 320 of system 300. In a preferred embodiment, power is supplied to power modules 1 through N at a single power input port 340. It will be recognized by those skilled in the art that it is not necessary that power be supplied to power modules 1 through N at a single power input port. Rather, each power module may receive power from a separate power source such as separate AC-DC converters (not shown).

In one exemplary system, the power modules 1 through N are buck converters having a synchronous rectifier in place of the freewheeling diode, as shown in FIG. 1. For this exemplary system, because the synchronous rectifier allows reverse current flow, a system failure may result, e.g. from recycling one or more modules while the system is already in operation, and powering on each of paralleled modules at different times, etc.

A need therefore exists for a circuit that actively and efficiently controls the synchronous rectifier in the respective power converters in a system having paralleled power converters in order to eliminate the synchronous rectifier back bias problem. There is also a need for a circuit that provides this function during the soft start period of a power converter in a paralleled converter configuration.

SUMMARY OF THE INVENTION

The present invention solves the problems of prior art devices by providing, in a system comprising a plurality of paralleled converters, a control circuit that efficiently prevents the turning on of the synchronous rectifier in a buck converter during a predetermined condition, so as to prevent current reversing through the synchronous rectifier during that time. In one embodiment, the present invention provides control of the synchronous rectifier during the soft-start time for a non-isolated DC-DC buck converter, thereby preventing current reversing (sinking) during its soft start process. In another embodiment of the present invention, a circuit uses a signal indicative of a soft-start condition for a converter to prevent the turning on of the synchronous rectifier during the soft-start time. The present invention also solves the synchronous rectifier back bias problem during the soft-start of a converter used in a paralleled converter configuration.

Consequently, embodiments of the present invention have the advantage of preventing the synchronous rectifier back bias problem and doing so at reduced cost using fewer components than known devices.

Broadly stated, the present invention provides, in a system having a buck converter comprising a switch, an inductor, a capacitor and a synchronous rectifier, the buck converter having two input terminals to which an input DC voltage is coupled and two output terminals where the output DC voltage is provided, the synchronous rectifier having a control input and being controlled such that when the switch is open, current through the inductor is maintained by a path provided by the synchronous rectifier, and having a pulse width modulator (PWM) having an output designed to provide control of the state of the synchronous rectifier; a control circuit coupled between the PWM output and the control input of said synchronous rectifier for controlling the synchronous rectifier during a predetermined condition, comprising a comparator circuit for comparing a feedback signal indicative of the predetermined condition to a predetermined reference voltage, such that said comparator circuit outputs a control signal when the predetermined condition is active; a driver circuit responsive to the control signal to turn off the synchronous rectifier when the predetermined condition is active so as to prevent the PWM from controlling the state of the synchronous rectifier and so as to enable the PWM to control the synchronous rectifier when said predetermined condition is not active.

Broadly stated the present invention also provides, a power system having a plurality of DC-DC converter modules, each having an input terminal to which an input DC voltage is coupled and an output terminal where the output DC voltage is provided, said converter modules being connected in parallel through their output terminals to a common bus connected to a load, each said converter module comprising: a buck converter for converting said input DC voltage to a regulated output DC voltage, said buck converter having a switch and an inductor connected in series between its respective input terminal and output terminal, said inductor having one end connected to its respective output terminal, a synchronous rectifier connected between said other end of said inductor and ground, and a capacitor connected between its respective output terminal and ground; a pulse width modulator (PWM) having an output designed to provide control of the state of said synchronous rectifier; a control circuit coupled between said PWM output and said control input of said synchronous rectifier for controlling said synchronous rectifier during a predetermined condition, comprising: a comparator circuit for comparing a feedback signal indicative of said predetermined condition to a predetermined reference voltage, such that said comparator circuit outputs a control signal when said predetermined condition is active; and a driver circuit responsive to said control signal to turn off said synchronous rectifier when said predetermined condition is active so as to prevent said PWM from controlling the state of said synchronous rectifier and so as to enable said PWM to control said synchronous rectifier when said predetermined condition is not active.

BRIEF DESCRIPTION OF THE DRAWINGS

The forgoing aspects and the attendant advantages of the present invention will become more readily appreciated by reference to the following detailed description, when taken in conjunction with the accompanying drawings, wherein.

DETAILED DESCRIPTION OF THE INVENTION

Figure 5:
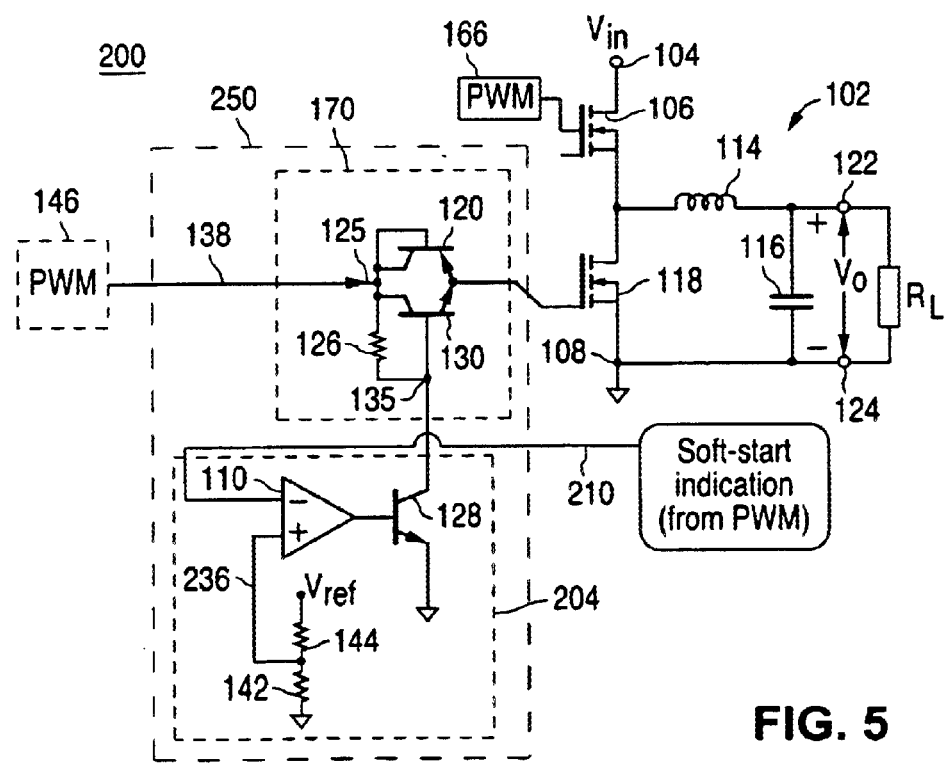
FIG. 5 shows a preferred embodiment of the circuit according to the present invention for a system having an accessible soft-start indication.

The present invention overcomes the drawbacks of known prior art circuits. A preferred embodiment of the circuit for each converter in a paralleled system of converters is shown in FIG. 5. The converter 200 has an input terminal 104 to which an input DC voltage $V_{in}$ is coupled relative to ground and an output terminal 122 where the output DC voltage $V_O$ of each converter module is provided relative to ground. Converter 200 includes a control circuit 250 coupled to a buck regulator 102 having a synchronous rectifier 118. The buck regulator 102 comprises a switch 106, an inductor 114, and a capacitor 116, connected in a conventional way between input terminal 104 and output terminal 122. An exemplary load $R_L$ is shown coupled to the output of converter 200. Switch 106 is typically a power MOSFET which is controlled in a known manner by a PWM 166 that is responsive to the output voltage $V_o$. When the switch 106 is closed, the capacitor 116 is charged via switch 106 and inductor 114 from the input voltage to produce the output voltage $V_o$, which is consequently less than the peak input voltage. When switch 106 is open, current through the inductor 114 is maintained via synchronous rectifier 118.

Figure 1:
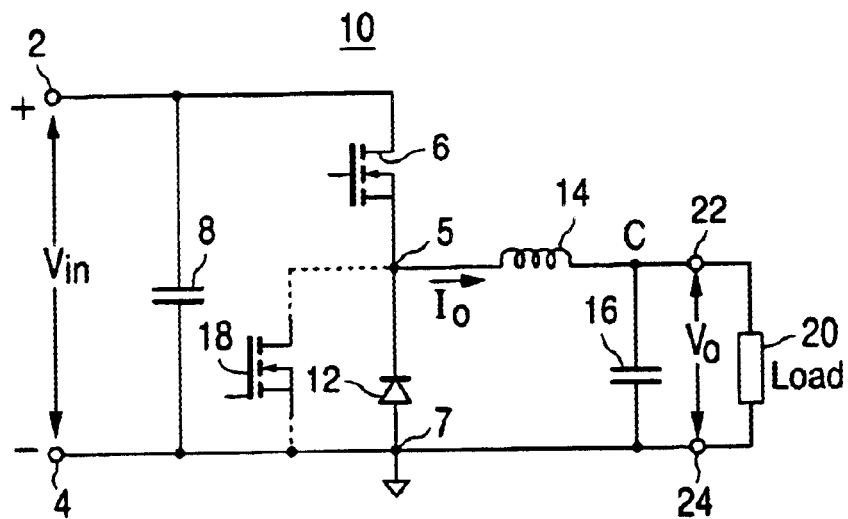
FIG. 1 illustrates a typical prior art non-isolated DC-DC buck converter.

In buck regulator 102, the synchronous rectifier 118 replaces a conventional freewheeling diode, as is shown in FIG. 1, in order to boost power conversion efficiency. Synchronous rectifier 118 has a control input and is preferably a MOSFET whose control input is the gate of the MOSFET. The synchronous rectifier 118 permits bi-directional current flow. As a result, the inductor current can flow in reverse through synchronous rectifier 118 from the output. The synchronous rectifier 118 is conventionally controlled directly by a pulse width modulator PWM 146. Switch 106 and synchronous rectifier 118 may be driven by the same pulse width modulator. It is well known conventionally that the control signals from the pulse width modulator for the control inputs of switch 106 and synchronous rectifier 118 must be complementary signals such that both devices are not turned on at the same time, so as to avoid shorting the input terminal 104 to ground. As seen in FIG. 5, for converter 200, however, a control circuit 250 is coupled between a PWM 146 and the gate input of the synchronous rectifier 118. Thus, for the present invention, a PWM is not directly coupled to the control input of the synchronous rectifier 118. According to the embodiment of the present invention shown in FIG. 5, control circuit 250 provides direct control of the on and off state of synchronous rectifier 118.

Control circuit 250 includes a comparator circuit 204 coupled to a driver circuit 170 that is coupled directly to the gate input of synchronous rectifier 118. The driver circuit 170 comprises a PNP transistor 120, an NPN transistor 130, and a resistor 126. Transistor 120 has a base and collector, both coupled to PWM 146 at node 125, and an emitter coupled to the control input of synchronous rectifier 118. Transistor 130 has a collector coupled to PWM 146 at node 125, an emitter coupled to the control input of synchronous rectifier 118, and a base coupled through resistor 126 to node 125. The base of transistor 130 is also coupled to the comparator circuit 104 at a node 135.

Comparator circuit 204 includes a transistor 128. Transistor 128 is shown as an NPN transistor in FIG. 5. Transistor 128 is preferably a bipolar transistor type. As shown in FIG. 5, transistor 128 has a collector connected to node 135, an emitter coupled to ground, and a base. The base of transistor 128 is coupled to the output of a comparator 110.

The comparator 110 has a positive input and a negative input. A reference signal 236 is coupled to the positive input of comparator 110. The reference signal 236 is preferably generated by a conventional voltage divider circuit coupled to a voltage reference $V_{ref}$. The voltage divider is preferably formed by a resistor 142 and a resistor 144 connected in series between $V_{ref}$ and ground.

For the preferred embodiment of the circuit of the present invention shown in FIG. 5, a soft-start indication signal 210 is fed back to the negative input of comparator 110 in control circuit 250. The soft-start indication signal 210 is preferably provided by PWM 146. As described above with reference to FIG. 2, it is during the soft-start period of the buck converter when the synchronous rectifier back bias problem is experienced. Thus, preferably a signal indicative of this soft-start period is used by the control circuit of the present invention to eliminate this problem. Once the soft-start sequence is completed, and the buck converter is outputing the required output voltage for normal operation, the soft-start indication signal is not longer active.

The operation of the converter 200 will now be described in further detail. During the soft-start period of the buck converter 102, control circuit 250 operates to block the PWM from controlling the synchronous rectifier 118. When the buck converter 102 is not in the soft-start period, control circuit 250 enables the PWM to control the synchronous rectifier 118 of the buck converter 102.

For the embodiment in FIG. 5, comparator 110 compares the soft-start indication signal 210 to the reference signal 236. During the soft-start period, signal 210 is active. Preferably, the reference signal 236 is set to a predetermined level such that signal 236 is higher than the level of the soft-start indication signal 210 when the converter is in soft-start mode, and reference signal 236 is not higher than the soft-start signal when the converter is not in soft-start mode. As a result, comparator 110 outputs a "high" signal during the soft-start period of the converter, and a "low" signal otherwise.

Thus, during soft-start mode of the converter, comparator 110 sets the base of transistor 128 high, thereby causing transistor 128 to switch to a conductive state. During this conductive state, because the emitter is coupled to ground, the voltage at the collector of transistor 128 is also pulled down to a low voltage level near ground. The base of transistor 130 at node 135 is coupled to the collector of transistor 128, and so is also pulled down to a low voltage level near ground. As a result, transistor 130 is nonconductive.

Conventionally, the PWM outputs a high level signal, preferably 5V, at signal line 138 in order to set the synchronous rectifier 118 in an "on" conductive state. When transistor 130 is non-conductive, it prevents signal 138 from being coupled to the control input of the synchronous rectifier.

Transistor 120 is a PNP transistor having a base and collector connected to the PWM at node 125, and an emitter connected to the control input of the synchronous rectifier 118. Thus, transistor 120 does not provide a path for the PWM 146 to set the control input of the synchronous rectifier 118. As a result, during the soft-start period of the buck converter 102, the circuit of the present invention blocks PWM 146 from controlling the synchronous rectifier 118. If the synchronous rectifier 118 was on during the soft-start period, transistor 120 functions to turn synchronous rectifier 118 off by discharging the gate charge at the its control input. Control circuit 250 holds synchronous rectifier 118 in the off state until the soft-start indication signal 210 indicates the converter is no longer in soft-start.

When the converter is not in soft-start mode, the output of comparator 110 is low, the base of transistor 128 is low, making transistor 128 non-conductive. This causes the collector of 128 to present a floating level to the base of transistor 130 at node 135. As a result, driver circuit 170 no longer blocks the PWM from the control input of the synchronous rectifier 118, thereby allowing the PWM to control the state of the synchronous rectifier 118. Thus, during the soft-start period the control circuit 250 turns off synchronous rectifier 118 and keep it off during this period, thereby preventing reverse current flow through the synchronous rectifier 118 and solving the back bias problem.

Figure 4:
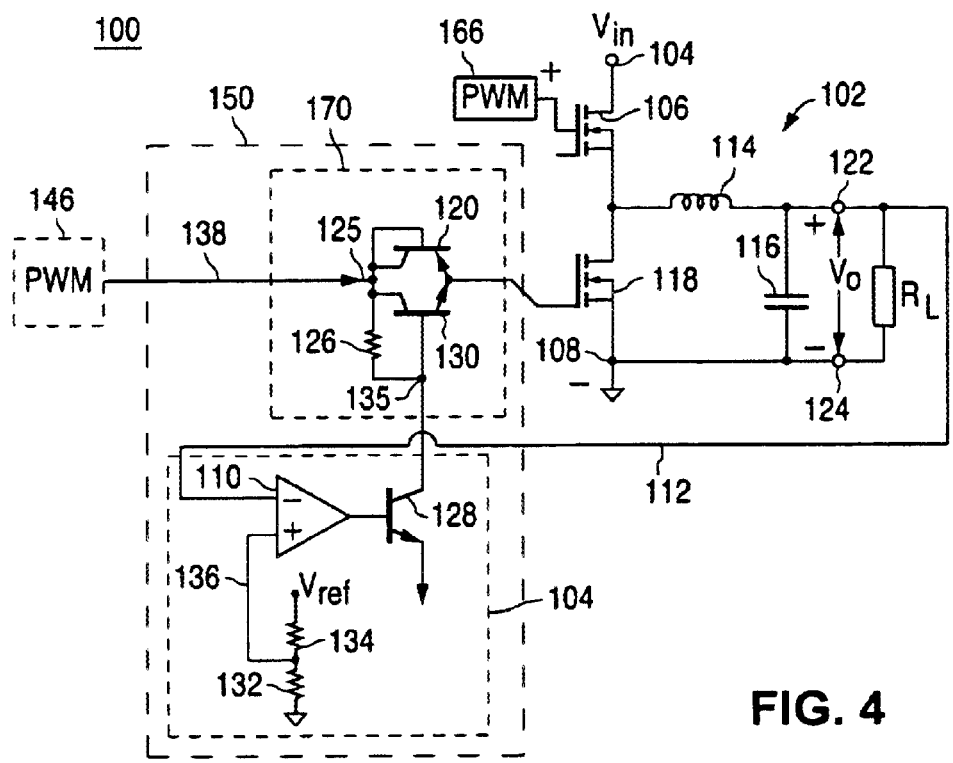
FIG. 4 shows an embodiment of the circuit according to the present invention for use in a system that does not provide a signal indicative of the soft-start condition.

FIG. 4 shows an alternate embodiment of the circuit according to the present invention for use for a system that does not provide a signal indicative of the soft-start condition. As seen in FIG. 4, the converter 100 differs from the embodiment in FIG. 5, since in FIG. 4, the output voltage at terminal 122 is fed back for comparison to a reference by comparator 110 rather than a soft-start indication signal. For converter 100, a suitable reference signal 136 is provided by a voltage divider circuit formed by a resistor 132 and 134 in order to output a signal from comparator 110, such that the comparator output is active during the soft-start period.

For another alternate embodiment, any suitable signal can be fed back to the control circuit 250, in order to disable the synchronous rectifier 118 during a predetermined condition.

Figure 2:
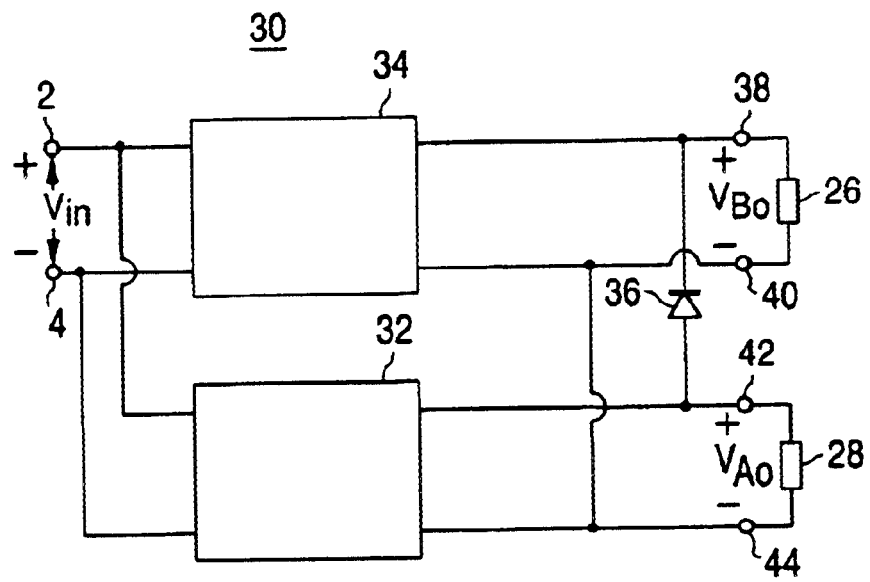
FIG. 2 is a block diagram of a prior art system having two power modules connected in a sequencing configuration to supply power to separate loads.
Figure 3:
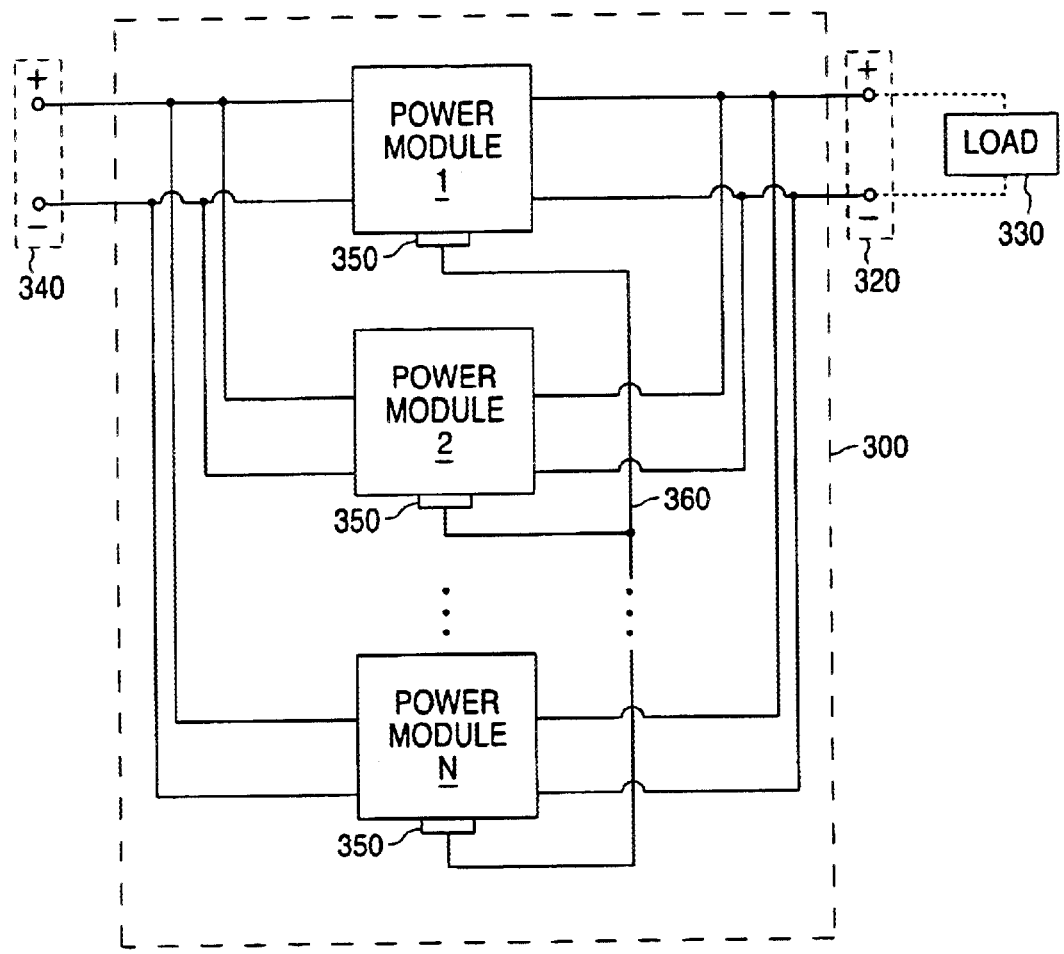
FIG. 3 is a block diagram of a prior art system of power modules connected in parallel through their output terminals to a common bus connected to a load.

According to another embodiment, the present invention provides a system that solves the aforementioned synchronous rectifier back bias problem for a converter used in a paralleled converter configuration, wherein each converter corresponds to converter 100 in FIG. 4. Two embodiments of the paralleled configuration of converters are shown in FIGS. 2 and 3. Alternately, the present invention provides a system of paralleled converters wherein each converter corresponds to converter 200 in FIG. 5

The foregoing detailed description of the invention has been provided for the purposes of illustration and description. Although exemplary embodiments of the present invention have been described in detail herein with reference to the accompanying drawings, it is to be understood that the invention is not limited to the precise embodiments disclosed, and that various changes and modifications to the present invention are possible in light of the above teaching.

What is claimed is:

1. In a system having a buck converter comprising a switch, an inductor, a capacitor and a synchronous rectifier, said buck converter having two input terminals to which an input DC voltage is coupled and two output terminals where the output DC voltage is provided, said synchronous rectifier having a control input and being controlled such that when said switch is open, current through said inductor is maintained by a path provided by said synchronous rectifier, and having a pulse width modulator (PWM) having an output designed to provide control of the state of said synchronous rectifier; a control circuit coupled between said PWM output and said control input of said synchronous rectifier for controlling said synchronous rectifier during a predetermined condition, comprising:

a comparator circuit for comparing a feedback signal indicative of said predetermined condition to a predetermined reference voltage, such that said comparator circuit outputs a control signal when said predetermined condition is active; and a driver circuit responsive to said control signal to prevent said PWM from controlling the state of said synchronous rectifier when said predetermined condition is active; said driver circuit responsive to said control signal to change the state of said synchronous rectifier to off if said synchronous rectifier is on when said predetermined condition is active and to maintain the off state of said synchronous rectifier if said synchronous rectifier is off when said predetermined condition is active.

2. The control circuit of claim 1, wherein said predetermined condition is the soft-start condition of said converter.

3. The control circuit of claim 2, wherein said PWM provides said feedback signal indicative of said soft-start condition.

4. The control circuit of claim 1, wherein said comparator circuit comprises:

a comparator having a positive input and a negative input, said feedback signal being coupled to said negative input;

a voltage divider formed by a first resistor and second resistor connected in series between a reference voltage and ground and providing a divided voltage connected to said positive input; and a first transistor having a base coupled to the output of said comparator, an emitter coupled to ground and a collector coupled to a first node.

5. The control circuit of claim 4, wherein said driver circuit comprises:

a second transistor and an third transistor each having a base, collector and emitter; the base and collector of said second transistor and the collector of said third transistor being connected at a second node; the emitters of said second and third transistors being coupled to one another and to said control input of said synchronous rectifier; and a third resistor connected in series between said second node and the base of said third transistor at said first node.

6. The control circuit of claim 2, wherein said feedback signal is the output DC voltage.

7. A power system having a plurality of DC-DC converter modules, each having an input terminal to which an input DC voltage is coupled and an output terminal where the output DC voltage is provided, said converter modules being connected in parallel through their output terminals, each said converter module comprising:

a buck converter for converting said input DC voltage to a regulated output DC voltage, said buck converter having a switch and an inductor connected in series between its respective input terminal and output terminal, said inductor having one end connected to its respective output terminal, a synchronous rectifier connected between said other end of said inductor and ground, and a capacitor connected between its respective output terminal and ground;

a pulse width modulator (PWM) having an output designed to provide control of the state of said synchronous rectifier; and a control circuit coupled between said PWM output and said control input of said synchronous rectifier for controlling said synchronous rectifier during a predetermined condition comprising a comparator circuit for comparing a feedback signal indicative of said predetermined condition to a predetermined reference voltage, such that said comparator circuit outputs a control signal when said predetermined condition is active; and a driver circuit responsive to said control signal to turn off said synchronous rectifier when said predetermined condition is active so as to prevent said PWM from controlling the state of said synchronous rectifier and so as to enable said PWM to control said synchronous rectifier when said predetermined condition is not active.

8. The power system of claim 7, wherein said predetermined condition is the soft-start condition of said converter.

9. The power system of claim 8, wherein said PWM provides said feedback signal indicative of said soft-start condition.

10. The power system of claim 7, wherein said feedback signal is the output DC voltage.

11. The power system of claim 7, wherein said converter modules are connected in parallel through their output terminals to a common bus connected to a load.

12. The system of claim 7, wherein the system has two converter modules, wherein a diode is connected between the output terminal of a first one of said converter modules and the output terminal of a second one of said converter modules; said diode having a cathode connected to said second one of said converter modules and an anode connected to said first one of said converter modules; each said converter module connected through their respective output terminals to a load; wherein said two converter modules are powered on sequentially according to a predetermined sequence such that said first one of said converter modules begins operation before said second one of said converter modules begins operation.

13. The power system of claim 7, wherein said comparator circuit comprises:

a comparator having a positive input and a negative input, said feedback signal being coupled to said negative input;

a voltage divider formed by a first resistor and second resistor connected in series between a reference voltage and ground and providing a divided voltage connected to said positive input; and a first transistor having a base coupled to the output of said comparator, an emitter coupled to ground and a collector coupled to a first node.

14. The power system of claim 13, wherein said driver circuit comprises:

a second transistor and an third transistor each having a base, collector and emitter; the base and collector of said second transistor and the collector of said third transistor being connected at a second node; the emitters of said second and third transistors being coupled to one another and to said control input of said synchronous rectifier; and a third resistor connected in series between said second node and the base of said third transistor at said first node.

* * * * *